UNITED STATES PATENT OFFICE.

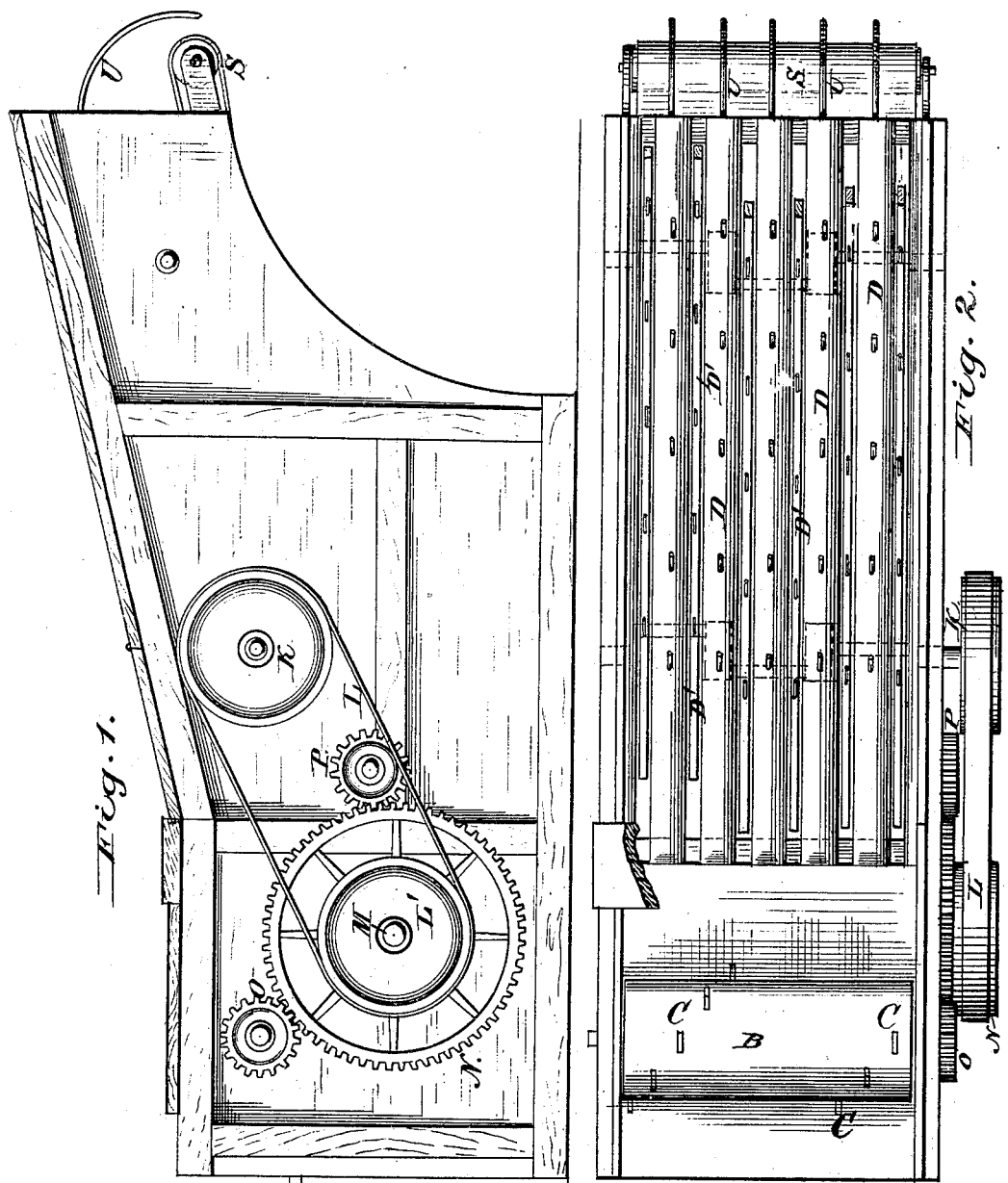

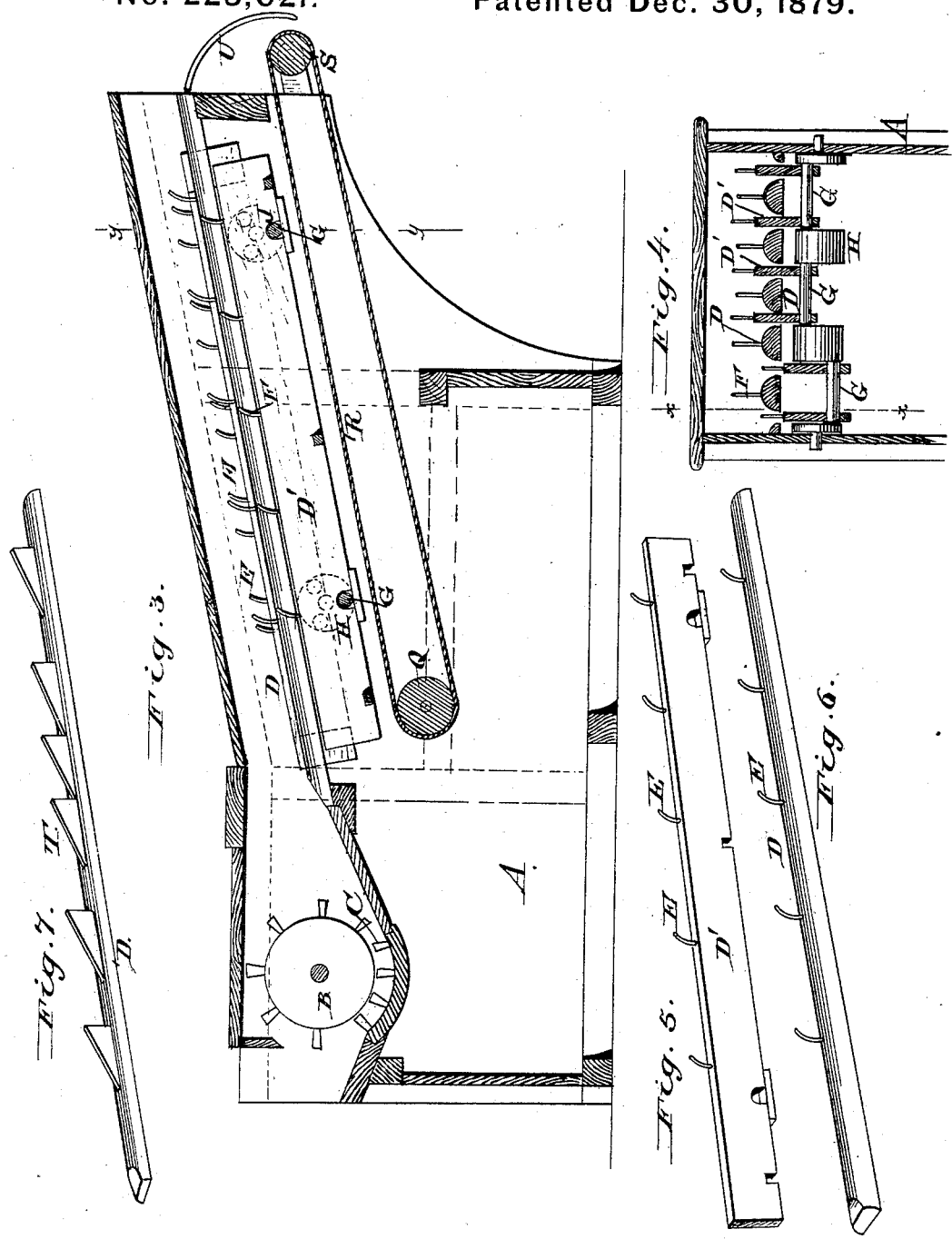

WILLIAM WORKMAN, OF WEST DE PERE, WISCONSIN.

IMPROVEMENT IN GRAIN-SEPARATORS.

Specification forming part of Letters Patent No. 223,021, dated December 30, 1879; application filed September 28, 1878.

*To all whom it may concern:*

Be it known that I, WILLIAM WORKMAN, of West De Pere, in the county of Brown and State of Wisconsin, have invented certain new and useful Improvements in Combined Grain-Separator and Straw-Carrier, of which the following is a specification.

This invention relates to certain improvements in thrashing-machines of that class in which a series of reciprocating rake-bars operating through the slots of an inclined slotted platform are employed to carry the straw to the delivery end of the apparatus and separate the grain therefrom in its passage; and it has for its object to provide a means for partially holding back or retarding the progress of the straw while it is carried outward by the rake-bars and facilitate the separation of the grain therefrom and insure its delivery to a traveling belt below.

My invention consists, first, in the combination, in a thrashing-machine, of a stationary platform extending from the beater to the delivery end of the apparatus, and composed of a series of parallel bars provided with a series of curved teeth, and a series of longitudinally and vertically reciprocating toothed rake-bars, adapted to operate between said bars of the platform with their teeth projecting through between said bars at all points of their movement. The straw, on leaving the beater, is caught by the teeth of the reciprocating bars, and moved along the platform toward the discharge end of the apparatus, the said reciprocating bars lifting the straw and dropping on the platform intermittently. The hooks on the stationary platform offer a certain degree of resistance to movement of the straw in both directions, loosening the mass and permitting the grain to fall out, after which it passes between the sides of the platform-bars and reciprocating bars, falling upon the apron below, which carries it off to a proper receptacle. As the reciprocating bars move toward the beater they also move downward, and of course do not move the straw inwardly at each reciprocation the same distance that they move it outward on their rising and rearward movement. The straw is therefore finally carried to the discharge end of the apparatus.

It consists, secondly, in the combination, in a thrashing-machine, of a series of parallel bars having rounded or sloping upper faces, and forming a platform, and provided with curved teeth, with a series of reciprocating toothed rake-bars having their teeth arranged to project through between said platform-bars at all points of their movement, the rounded or sloping faces of the bars facilitating the passage of the grain from the platform and to the apron below.

It consists, thirdly, in the combination, in a thrashing-machine, of a series of parallel bars having rounded or sloping upper faces, and forming an inclined platform, and provided with curved teeth, with a series of reciprocating toothed rake-bars having their teeth arranged to project through between said bars at all points of their movement. The inclination of the platform aids in the retardation of the progression of the straw and affords time for its thorough opening by the teeth.

In the drawings, Figure 1 represents a side elevation of my apparatus. Fig. 2 represents a top view thereof, with a portion removed to show the beater. Fig. 3 represents a longitudinal vertical section through the apparatus in a line with one of the rounded bars of the platform, and Fig. 4 represents a transverse vertical section. Fig. 5 represents a detached view of one of the rake-bars; Fig. 6, a detached view of one of the rounded bars of which the platform is composed, and Fig. 7 a detached view of a modification of the said bars.

The letter A represents the frame or casing of my improved apparatus, which may be of the ordinary or any approved construction, and which is provided at or near the feed end with a beater, B, and a series of separating-teeth, C, as usual.

The letter D represents a series of parallel bars, rounded or semi-cylindrical in cross-section, with their convex sides upward, which extend in an inclined direction from the beater upward to the delivery end of the apparatus, forming an inclined stationary platform. Said bars are set at suitable distances apart to permit a series of reciprocating rake-bars, D', to reciprocate longitudinally and vertically between them. The upper or rounded sides of the bars, constituting the stationary platform, are provided with a series of hooks, E, arranged at suitable distances apart, all curved in the same direction toward the delivery end of the apparatus, and the reciprocating rake-bars are provided with curved teeth F, similarly arranged. The said rake-bars are mounted on cranks G on the rotating shafts H and J, journaled, respectively, below the opposite ends of the inclined platform, the lower shaft, H, being provided at one end with a pulley, K, from which extends a belt, L, to a similar pulley, L', on the driving-shaft M of the apparatus. Said driving-shaft is also provided with a gear-wheel, N, which intermeshes with the toothed pinions O P, secured, respectively, to the shaft of the beater and the shaft of the lower drum, Q, of an inclined apron, R, located below the inclined platform, the upper drum, S, of said apron being journaled beyond the delivery end of the apparatus; and above the end of the apron is located a curved slotted separator, U, the object of which is to permit any grain remaining in the straw, when passing out of the apparatus, to fall upon the apron and be saved.

In the modification shown in Fig. 7 the rounded bars forming the stationary platform are provided with a series of serrations or teeth, T, instead of hooks. Said teeth are inclining in one direction toward the delivery end of the apparatus.

The operation of my invention is as follows: Upon putting the apparatus in operation and feeding in the straw, the same, after passing the beater, is caught and moved onward by the hooks on the reciprocating rake-bars. The hooks on the stationary platform, however, offer a certain degree of resistance to the progressive movement of the straw, loosening the mass and permitting the grain to fall out, after which it passes between the rounded sides of the bars and the reciprocating rakes, falling without obstruction on the apron below, which carries it off to a proper receptacle.

The teeth of the rake-bars I make of such length that they will project through between the bars of the platform at all points of their movements, both forward and backward, in order that they may have a double action upon the straw in connection with the platform-teeth, though their curvature outward and the lifting action of the bars cause the straw to be finally carried outward.

What I claim as my invention is—

1. The combination, in a thrashing-machine, of the stationary platform composed of a series of parallel bars provided with a series of curved teeth, and a series of longitudinally and vertically reciprocating toothed rake-bars adapted to operate between said bars of the platform, with their teeth projecting through between said bars at all points of their movement, substantially as described.

2. The combination, in a thrashing-machine, of a series of parallel bars having rounded or sloping upper faces, and forming a platform, and provided with curved teeth, with the reciprocating toothed rake-bars having their teeth arranged to project through between said bars at all points of their movement, substantially as described.

3. The combination, in a thrashing-machine, of a series of parallel bars having rounded or sloping upper faces, and forming an inclined platform, and provided with curved teeth, with the reciprocating toothed rake-bars having their teeth arranged to project through between said bars at all points of their movement, substantially as described.

In testimony that I claim the foregoing I have hereunto set my hand in the presence of the subscribing witnesses.

WILLIAM WORKMAN.

Witnesses:
JAMES L. NORRIS,
JAS. A. RUTHERFORD.